Figure 2:
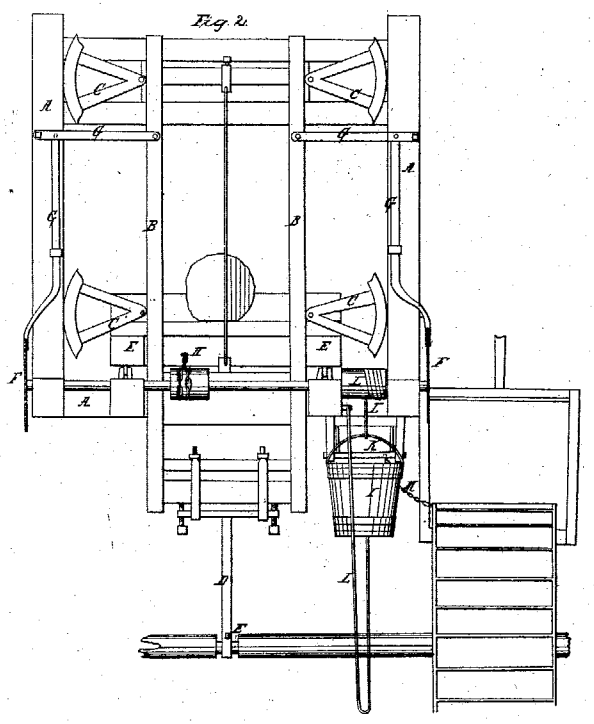
Figure 1:
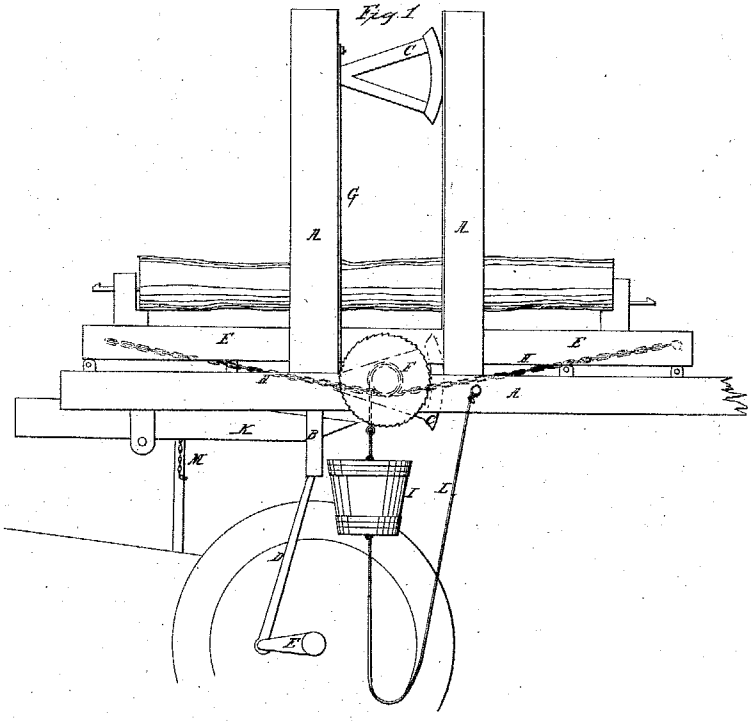

7453X

2 Sheets. Sheet 1.

7453X

H. Gordon,

Reciprocating Saw Mill.

Patented Feb. 28. 1838.

AM. PHOTO-LITHO. CO. N.Y. (OSBORNE'S PROCESS)

7453 Y
2 Sheets-Sheet 2.
H. Gordon,
Reciprocating Saw Mill.
Patented Feb. 28. 1833.
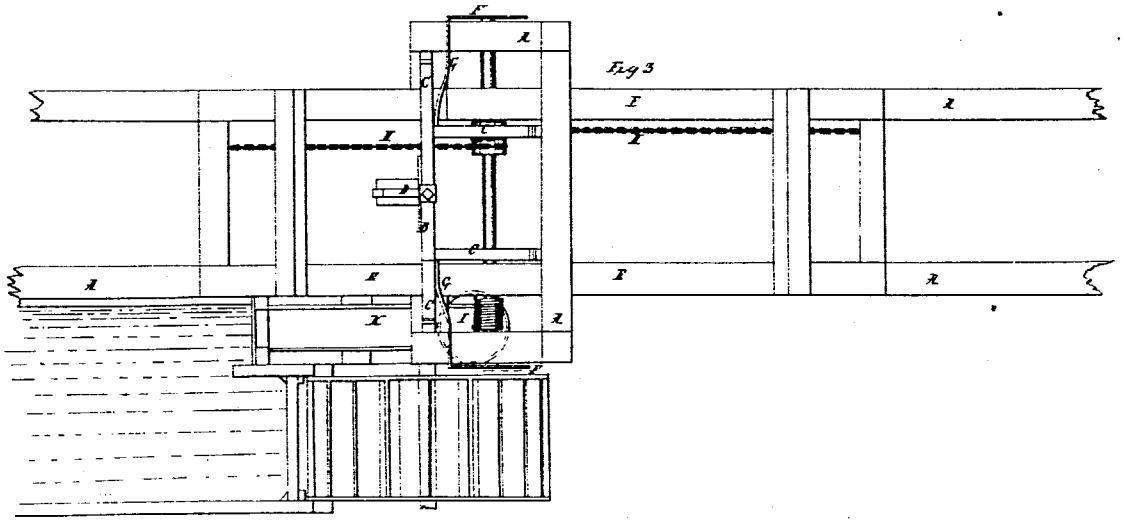
AM. PHOTO-LITHO. CO. N.Y. (OSBORNE'S PROCESS)

X 7453

Feb. 28. 1833

Henry Gordon, of Liberty Township. Pennsylvania

Letters Patent

The schedule referred to in these Letters Patent and making part of the same, containing a description in the words of the said Henry Gordon himself of his improvement in the Saw mill for sawing boards and timber, called "Gordon's Saw Mill"

Be it known that I Henry Gordon of Liberty Township Adams County and State of Pennsylvania, have made an improvement in the useful art, being a saw Mill for sawing boards, and timber called "Gordon's Saw Mill" which is described as follows. This saw mill consists of the following principal parts viz The frame which supports the works the saw frame which supports the saw or saws; and the vibrating arms, by which the saws are moved up and down; the carriage upon which the log is moved backward and forward, the rag wheel and fender for moving the carriage; the water wheel and crank; the trough containing water; and the bucket to be filled with water for drawing back the carriage The frame is constructed in the usual way, and is adapted in size and strength for the work intended to be contained in it The saw frame, for the saw or saws is constructed in the usual manner, and the saw or saws is fixed therein, It is supported by the crank to be hereafter described, & is guided by eight vibrating arms, four above and four below working on joints or hinges, they vibrate or play in the segment of a circle against posts or uprights in the frame, or they may be constructed by mortising & tenoning the

[illegible]

rocking or vibrating arms into a cross bar, or into the sides of the saw frame.

The carriage upon which the log is placed and moved back-wards and forwards, is made in the usual way, and moves upon rollers fixed in the frame. It is moved backwards and forward by the winding and unwinding of a chain or cord attached to each end of the carriage and wound round the axle of the rag wheel The Rag wheel and Feeder, for moving the carriage is made in the usual way except that the rag wheel is double and the feeder which is attached to the saw frame, and a post is made to feed only when the saw goes down The water wheel may be constructed in the usual way like a common flutter wheel, or it may be a chain water wheel turning on two Rollers one above and one below, On the axle of the water wheel is a crank and Pitman attached to the saw frame, and by which it is moved up and down, The pitman is attached to the frame, by having a cross piece with a screw on each end and an oval point or segment of a sphere upon which the saw gate or frame works, Iron straps pass from the ends of the before mentioned cross piece over the lower bar of the frame to a small bar above it, where it is screwed fast by nuts and the pitman adjusted, A trough which is filled with water by a spout from the race is placed on an axle [illegible] near the rag wheel, A bucket is suspended by a rope or chain wound round the axle of the rag-wheel under the trough, A cord is attached to the bottom of this bucket and a pin in the frame for canting it when the cut in the log has been given, the trough is upset by a string from the gate of the mill, which fills the bucket below, and causes it to descend and carry back the carriage by unwinding the cord on the axle of the rag wheel, when the bucket has descended to a depth equal to the length of the log, it is then — wheel by the cord attached to its bottom and the beforementioned pin

Operation, the log being prepared is fastened on the carriage in the usual way, the water wheel being put in motion, gives motion to the crank and pitman on its gudgeon, the pitman moves the frame and saw up and down to cut the log, at the same time the motion of the saw downwards works the feeder and rag wheel which moves the carriage and log by the cord attached to the carriage, being wound on the axle of the rag wheel, the gate is shut in the usual way by that pitman the carriage and the carriage is brought back as before described, by the vibrating trough and descending bucket of water The invention here claimed and desired to be secured by Letters Patent, is the before described saw mill, particularly the mode in which the saw frame is hung: the vibrating or rocking arms: and the mode in which the carriage is moved backward and forward, For a further illustration of my invention I refer to the model and drawing of the same deposited in the Patent Office In testimony whereof I have subscribed my name before two witnesses this 20th day of February 1833, Witnesses Chs. M. Keller.
Wm P. Elliot Henry Gordon

80

[illegible]